United States Patent [19]

Wentworth

[11] Patent Number: 4,523,737
[45] Date of Patent: Jun. 18, 1985

[54] SLEEVE VALVE ACTUATOR MEANS
[75] Inventor: Milo R. Wentworth, Deerfield, Ill.
[73] Assignee: Honeywell Inc., Minneapolis, Minn.
[21] Appl. No.: 476,953
[22] Filed: Mar. 21, 1983
[51] Int. Cl.³ .............................................. F16K 7/06
[52] U.S. Cl. ........................................ 251/4; 251/58; 251/213; 251/294; 74/108
[58] Field of Search ............... 251/4, 294, 58, 213; 74/89.2, 89.22, 108; 254/337, 385, 386

[56] References Cited

U.S. PATENT DOCUMENTS

| 181,761 | 8/1876 | Borger | 254/386 |
|---|---|---|---|
| 335,404 | 2/1886 | Walsh et al. | 254/294 |
| 497,706 | 5/1893 | Chase et al. | 254/386 |
| 2,483,401 | 10/1949 | Cole | 251/294 |
| 2,559,733 | 7/1951 | Pitman et al. | 74/108 |
| 2,808,849 | 10/1957 | Pottmeyer | 251/294 |
| 2,827,259 | 3/1958 | Kindt | 251/294 X |
| 2,848,977 | 8/1958 | Prestrud et al. | 254/386 |
| 3,044,312 | 7/1962 | Hall et al. | 74/89.22 |
| 3,396,946 | 8/1968 | Maddock | 254/189 |
| 3,593,824 | 7/1971 | Gregory | 254/386 |
| 3,717,205 | 2/1973 | Wilderman | 254/337 |
| 4,092,010 | 5/1978 | Carlson, Jr. | 251/4 |
| 4,235,421 | 11/1980 | Phillips | 254/386 |
| 4,419,707 | 12/1983 | Woodier | 360/106 |

FOREIGN PATENT DOCUMENTS 534574  12/1956  United Kingdom .................. 74/108

Primary Examiner—Samuel Scott
Assistant Examiner—Allen J. Flanigan
Attorney, Agent, or Firm—Alfred N. Feldman

[57] ABSTRACT

An actuator means is provided for a sleeve type of valve wherein a cable or flat band is caused to rotate one end of a sleeve valve with respect to a fixed second end. The relative rotation can be accomplished to operate the valve and can be provided by a simple linear operating type of pneumatic operator. One version of the disclosure provides an actuator that requires no return spring other than that which would normally be present in the pneumatic actuator itself.

7 Claims, 6 Drawing Figures

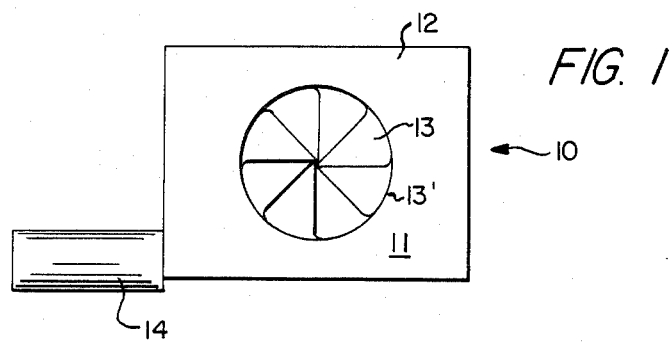
FIG. 1
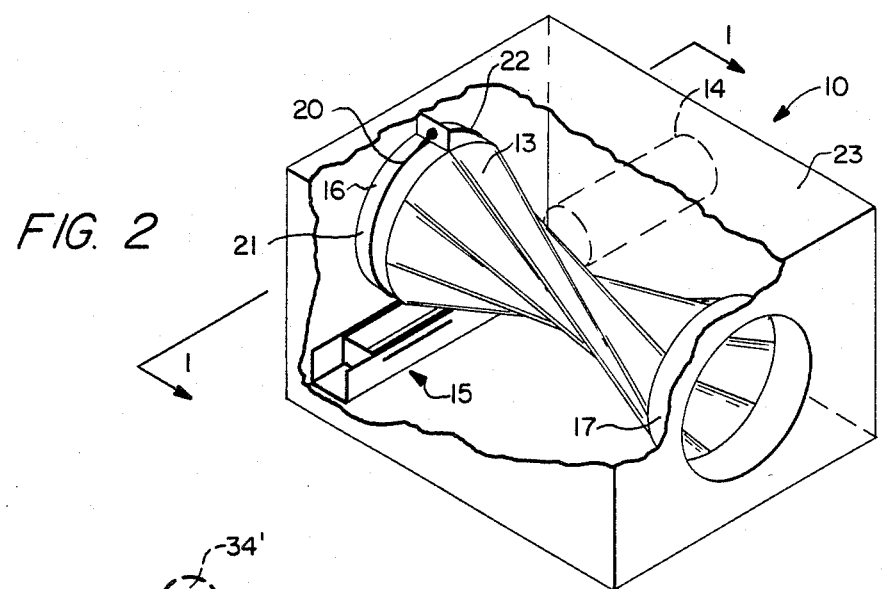
FIG. 2
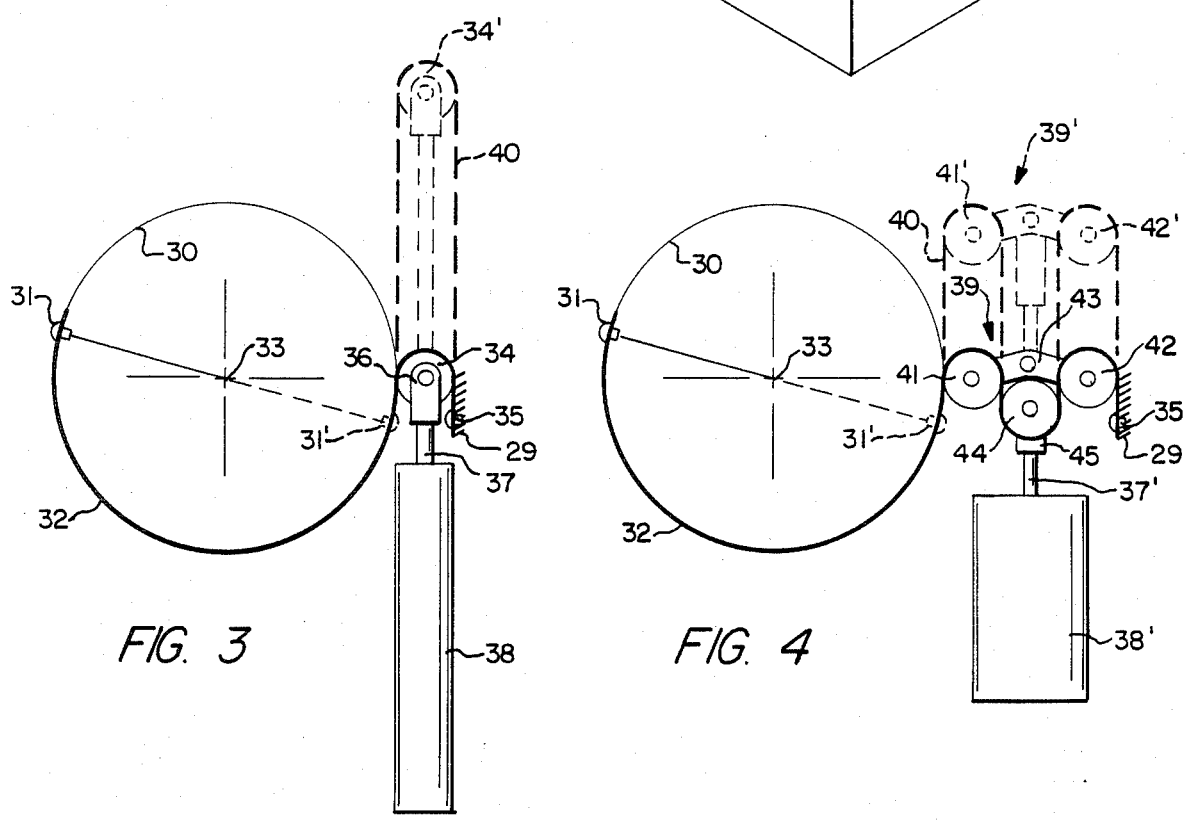
FIG. 3
FIG. 4

SLEEVE VALVE ACTUATOR MEANS

BACKGROUND AND SUMMARY OF THE INVENTION

The handling of fluids, such as air, have been accomplished by the use of various types of valves or dampers. Air valves or dampers in heating and ventilating applications require large, substantially unimpeded passages through which air flow can be directed. Typically, air flow has been handled in ducts by the positioning of a damper which is operated by some type of motor and actuator. These structures, while adequate for handling of air flow, tend to have problems with leakage and noise.

Sleeve valves have been introduced into this type of control environment. A sleeve valve is a tube or sleeve like member made of a pliable, non-porous material attached to two collars or rings at the ends of the valve means. One collar or ring is held in a fixed rotational manner while the other end is rotated. The relative rotation of the flexible sleeve shortens the length of the sleeve slightly, and allows the pliable or flexible material to close down to restrict the passage through the sleeve. This type of an arrangement can be used as a valve in a heating or ventilating application, and eliminates the need for a damper which can cause various types of problems, including noise problems.

While a sleeve type of valve can be used, a convenient and inexpensive means for providing the relative rotation of the two ends of the sleeve has not been available. The present invention is directed to an actuator means that is adapted to control a sleeve type of valve. The actuator can be an electric motor driving a gear train, or more typically would be a pneumatic motor driving a piston. The motor must have a linear or straight line output to provide a proper driving force for the valve actuator of the present invention. The linear motion of a piston driven shaft moves a slidable carriage in a fixed base. This linear motion allows a pulley means to take up a cable on the pulley means and this causes the end of the valve to rotate with respect to the other end of the valve. The cable is attached to act around the outer surface of one end of the valve. The end of the valve that does not rotate is adapted so that it can move to shorten the length of the valve to accommodate for the reduction of length of the sleeve material itself, as the valve is twisted to provide the closing action.

The present invention more particularly is directed to a structure that is readily adapted to pneumatically operated motors, and which is capable of rotating one end of a sleeve valve to operate the valve by sliding two relatively moveable members. The two moveable members are connected to the valve end by cables which cause the rotation of the valve to provide the necessary valving function.

BRIEF DESCRIPTION OF THE DRAWINGS

FIG. 1 is an end view of a sleeve valve with an actuator;

FIG. 2 is an isometric, cut away of the sleeve valve and actuator;

FIG. 3 is a pictorial representation of a simplified structure;

FIG. 4 is a pictorial representation of a second embodiment of a simplified actuator;

DESCRIPTION OF THE PREFERRED EMBODIMENT

Figure 5:
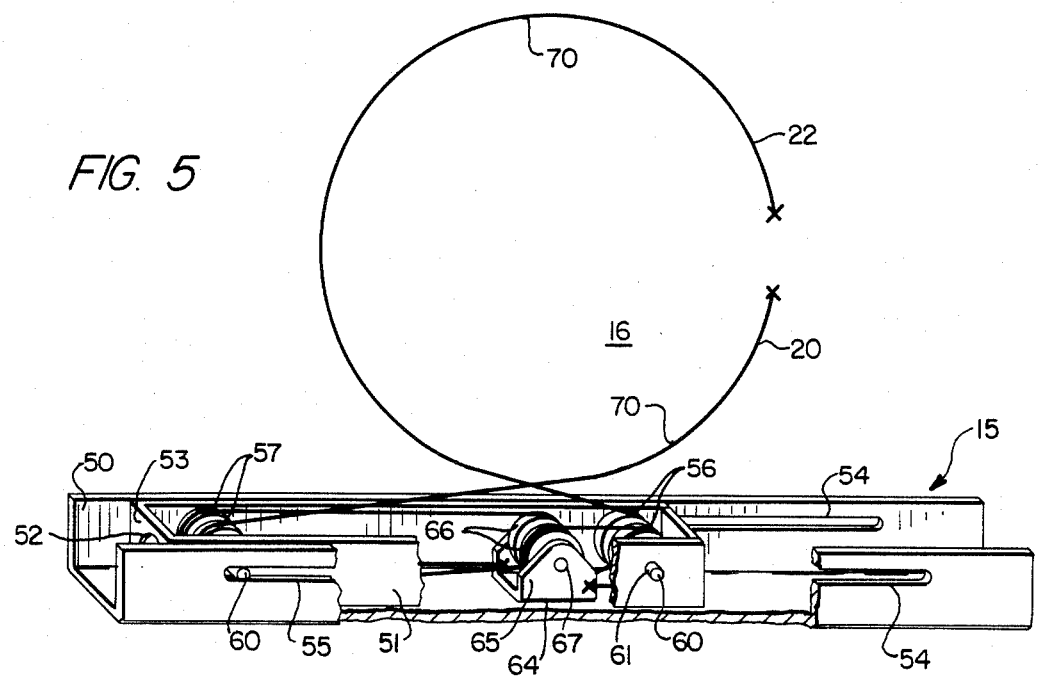
FIG. 5 is a cut away view of a detailed slidable actuator means for control of a sleeve valve.

The present invention is particularly adapted to control a sleeve type of valve generally disclosed in FIG. 1 at 10. A first end of the sleeve valve is disclosed at 11 and includes a sheet metal plate 12 along with the sleeve element 13 (shown in a closed position). When open, the sleeve valve would be an open passage, the diameter of which is indicated at 13'. The sleeve valve 10 is operated by a motor means 14 that has been disclosed as a piston like arrangement. The motor means 14 in its simplest form would be a pneumatically operated piston motor that will be described in more detail in connection with other Figures of the present drawings. The sleeve valve 10 typically could be used in a heating and ventilating application in which it controls air flow. Air flow would be into the plane of the drawing, and normally would flow through the sleeve element 13 (when open), as will be seen in FIG. 2.

In FIG. 2 there is an isometric view of a complete sleeve valve structure 10 including the actuator means disclosed at 15. The actuator means 15 will only be described in general terms in connection with FIG. 2, and will be disclosed in detail in FIGS. 5 and 6. The actuator means 15 is driven by the motor means 14 so as to rotate a first end 16 of the sleeve valve with respect to a second fixed end 17 of the sleeve valve. The sleeve valve 10 has been shown in its closed position wherein the sleeve element 13 is twisted by the rotation of the end 16 with respect to the end 17. This twisting action is accomplished by cables 20 and 22 that lie along the circumference 21 of the first end 16 and are connected to the actuator 15. As will be seen in the descriptions of FIGS. 5 and 6, the actuater means 15 is operated by the pneumatic motor 14 by a linear actuating means that forms part of the actuator 15. As linear motion occurs within the actuator 15, the cables 20 and 22 cause the end 16 to rotate to provide the valving action. A rotation of approximately 180 rotational degrees, wherein the cable 20 is shortened and the cable 22 is lengthened, causes the first end 16 to rotate in a counterclockwise direction (as seen in FIG. 2) to open the valve. The valve means 10 is completed by a housing 23 that typically would be a sheet metal housing to enclose and protect the sleeve 13, and the means 15 when the valve is installed in duct work in a heating and ventilating environment.

In FIG. 3 a very simplified configuration of an actuator means for a sleeve valve is disclosed. The sleeve valve is disclosed as a circle 30. The circle 30 can be considered the first or rotational end of the sleeve valve to which is riveted at 31 a cable or strap 32 that lies along the circumference of the end of the sleeve valve as represented by 30. The center of rotation of the sleeve valve is at 33. The cable or strap 32 is brought over a pulley 34 and is riveted at 35 to a fixed surface represented at 29. The pulley 34 is connected by a yoke 36 to a shaft 37 of a motor means 38, which again can be readily considered as a pneumatic actuator or piston type of motor. As was indicated previously, any type of motor could be used which has a linear output, but for simplicity of explanation and disclosure a piston type of pneumatic actuator 38 is disclosed. The valve is shown in solid lines for the first or open position for the valve in FIG. 3. When a pneumatic pressure is applied to the motor 38, the mechanism therein causes the piston shaft 37 to move the yoke 36 in an upward direction causing the pulley 34 to take up the cable 32 as shown in phantom position at 40. It will be noted that the pulley then reaches the position shown at 34', and the cable position 40 has been taken up between the rivet 35 and the phantom rivet position 31'. In operating from the position where the pulley 34 is disclosed versus the position of the pulley 34', the cable 32 is taken up so that the valve end 30 rotates approximately 180 degrees as is exemplified by the original position of the rivet 31 as opposed to its position 31' when the valve has been rotated to a closed position. As can be seen, the movement of the pulley between the two positions causes the shortening of the cable 32 to cause a rotational motion to be applied to the valve end 30 thereby providing the necessary operating mechanism for a sleeve type of valve.

In FIG. 4 there is disclosed a further version of the linear actuator mechanism of FIG. 3. Once again the valve end 30 is disclosed along with the rivet 31, the cable 32, the center of rotation 33, and a motor means 38'. In this case the motor means 38' has approximately half the length of the motor means 38. A shaft 37' is provided along with a pulley and idler arrangement generally disclosed at 39. The pulley and idler arrangement 39 includes a pair of pulleys 41 and 42 held in a separated position by an arm 43, along with an idler pulley 44. The pulley arrangement is attached so that the pulleys 41, 42, and 44 can rotate but are moved relative to each other by the shaft 37 and a yoke member 45. Pulley 44 remains fixed in space while pulleys 41 and 42 move relative to pulley 44.

It will be noted that the cable 32 passes around the circumference of the valve end 30 from the rivet 31 and passes over the first pulley 41. The cable then passes under the idler pulley 44 and then over the pulley 42, where it is riveted by rivet 35 to a fixed member 29, as was done in the case of the disclosure of FIG. 3.

It will be apparent that when the motor means 38' is pressurized and the shaft 37' moves in an upward direction, as is shown in phantom at 39' that the cable position 40 is over the pulley 41' and 42' while being extended by the idler pulley 44. With the arrangement disclosed, the movement of the actuator means 39 causes the rivet 31 to rotate to the position 31' thereby closing the sleeve valve 30. The arrangement of FIG. 4 accomplishes the same function as that in FIG. 3, but utilizes a motor means 38' with a linear output means 37' that is only one half the length of the output means 37 of FIG. 3.

The arrangements disclosed in FIGS. 3 and 4 show typical operating mechanisms for a sleeve valve wherein the sleeve valve has a return mechanism (not shown) to return the sleeve valve to its original position when the motor means 38 or 38' is deenergized. The version of the motor means and output means utilized for a practical drive mechanism for a sleeve valve as disclosed in FIG. 2, is disclosed in detail in FIG. 5 with an exploded view for an explanation of the function in FIG. 6.

In FIG. 5 there is disclosed, in detail, the actuator means 15 that was partially disclosed in FIG. 2. The actuator means 15 includes two relatively moveable members 50 and 51 which form the output means from the motor means 14. The motor means 14 would have an output means that includes a motor shaft that provides a linear motion that is connected to an opening 52 in an end 53 of the second of the two relatively moveable members 51. The two members 50 and 51 are shown as being slidable and in reality the member 50 would be ridgedly attached to the housing 23 of the sleeve valve 10 (FIG. 2). As such, the member 51 would move relative to the fixed member 50 in a slidable fashion.

The first member 50 has slots 54 and 55 at opposite ends that act as guide means for a pair of idler roller means 56 and 57. The idler roller means 56 and 57 can be a pair of pulleys mounted on central shafts 60 with the shafts 60 extending through the guide means or slots 54 and 55. The shafts 60 in each case are mounted through holes 61 in the member 51 so that the two idler rollers or members 56 or 57 are always kept spaced apart by a fixed distance. The idler rollers 56 and 57 can be fashioned in any convenient manner and typically would be a pair of pulleys mounted on the shafts 60. The pulleys each would have recesses across which the cables 20 and 22 pass. The locations of the cables will be discussed in more detail after the balance of the structure has been discussed.

The fixed or first of the relatively moveable or slidable members 50 has attached ridgedly thereto at 64 a bracket 65 that supports a pair of roller means 66 on a shaft 67. The member 66 again could be a pair of pulleys or could be a cylinder with two sets of grooves. The cylinder rotates around or with the shaft 67 when the device is operational. In any case, the support means 65 is ridgedly attached at 64 to the member 50 and thereby moves differentially with respect to the rollers 56 and 57 when the second member 51 moves within the member 50.

The locations of the cables for this mechanism will now be explained. The cable 20, which is attached to the first end 16 of the sleeve valve 10 (FIG. 2), lies along an outer surface or circumference of the valve end 16 as indicated at 70. The cable 20 then is passed over the first of pulleys 57 and back to the idler pulley 66. The cable then passes over pulley 66 and back to the second of pulleys 57 and then to a tie point 71 (FIG. 6) that is part of fixed member 65. This can be seen in the exploded view of FIG. 6.

The cable 22 passes in the opposite direction around the periphery or circumference 70 of the valve and then passes over the roller means 56. After passing over the first of the pulleys 56 the cable 22 passes over one of the idler pulleys 66 and back to the other of the pulleys 56 and then to a tie point 72 that is part of the fixed member 65. Again, reference is directed to FIG. 6 where in the exploded view of the cable arrangement the exact location of the cables, pulleys and idler can readily be seen.

Figure 6:
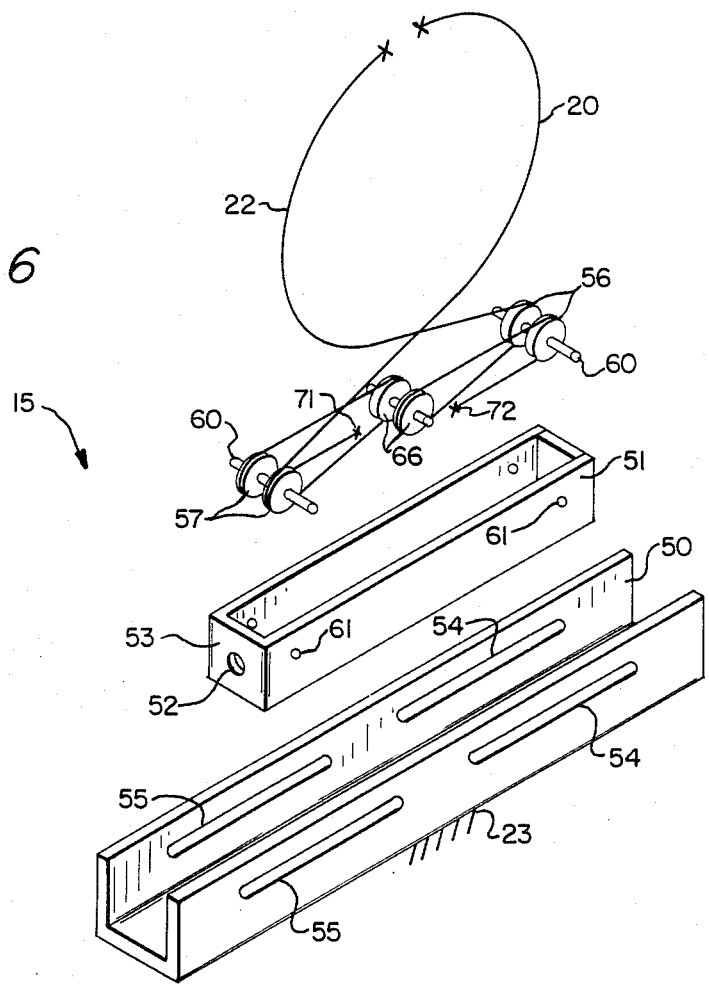
FIG. 6 is an exploded functional drawing of part of the actuator means of FIG. 5.

In FIG. 6 the exploded view further shows the slidable member 51 as exploded or outside of the fixed member 50 wherein the slots 54 and 55 can readily be seen. The support 65 for the idler pulleys 66 is not disclosed in FIG. 6, but is represented by the idler pulley 66 and the two tie points 71 and 72.

In FIGS. 5 and 6 the operation of the motor means and its output means can be readily understood by referring to the following brief explanation of the operation. The member 50 is ridgedly attached to the sheet metal 23 of the sleeve valve 10 and the relatively moveable member 51 slides within the member 50. The pulleys 56 and 57 are mounted within the slidable member 51 by the shafts 60 through the holes 61. The idler pulley means 66 is fixed along with the ends 71 and 72 of the cables 20 and 22 in the bottom of the first member 50 so that a slidable motion of the member 51 with respect to 50 causes a differential movement of the pulleys 56 and 57 with respect to the idler pulleys 66. As such, it is apparent that as this movement occurs one of the cables is lengthened while the other of the cables is shortened. This provides a positive drive in both directions for the end 16 of the valve 10 thereby eliminating the need for a separate return spring or mechanism other than the return spring which is normally present in the pneumatic actuator or motor means 14.

In FIGS. 2, 5, and 6, a sleeve valve and its associated means for operating the valve have been disclosed in great detail. This sleeve valve operating mechanism, or actuator means, is available to rotate the end 16 of the sleeve valve 10 with respect to the end 17. The end 17 in reality is fixed against rotation, but is capable of linear expansion to take up the shortening that is caused by the rotation and the twisting of the sleeve member 13. This type of valve can be used to control the flow of air in a ventilating system and eliminates many of the deficiencies of a conventional damper arrangement.

A number of different actuator means or operating arrangements that are adapted to control a sleeve valve have been disclosed. In view of the fact that the present concept can be implemented by a number of different physical embodiments, the applicant wishes to be limited in the scope of his invention solely by the scope of the appended claims.

The embodiments of the invention in which an exclusive property or right is claimed are defined as follows:

1. Actuator means adapted to control a sleeve type of valve having a first generally round end that rotates relative to a second end to cause said valve to be operated between an open position and a closed position, including: fluid pressure operated motor means having output means including a piston driven shaft providing a linear motion; flexible cable means having a first end fixed to said first end of said valve and having a portion of said cable means lying along an outer surface of said first end of said valve; said cable means having a second end attached to said motor output means; said motor means including mounting means to mount said motor means adjacent said valve with said motor output means positioned to provide said linear motion at a generally right angle to a center line of said valve to cause said first end of said valve to rotate with respect to said second end by said cable means winding or unwinding along said outer surface of said valve; said motor output means further including two relatively moveable members; a first of said relatively moveable members having center roller means ridgedly attached thereto; a second of said relatively moveable members being moveable with respect to said first moveable member and including two idler roller means with one each of said two idler roller means being attached to said second of said relatively moveable members on opposite sides of said center roller means; said center roller means moving differentially with respect to said idler roller means when said moveable members are moved with respect to each other; said cable means further including two cable portions; a first of said cable portions being connected to said first relatively moveable member and said first valve end after partially encircling said center roller means and a first of said two idler roller means; and a second of said cable portions being connected to said first relatively moveable member and said first valve end after partially encircling said center roller means and a second of said two idler roller means; said cable portions being arranged to cause said first valve end to rotate as said relatively moveable members are moved relative to each other by said motor means with said cable portions being differentially wound or unwound around said outer surface of said first valve end.

2. A sleeve valve actuator means as described in claim 1 wherein said moveable members are slidably related to each other with said first moveable member being a mounting base ridgedly fixed with respect to said valve; and said second moveable member being a carriage that is contained generally within said mounting base.

3. A sleeve valve actuator means as described in claim 2 wherein said center roller means and said two idler roller means are each roller means with two parallel recesses to position said two cable portions in a generally parallel relationship within said base and said carriage.

4. A sleeve valve actuator means as described in claim 3 wherein each of said roller means are pairs of pulleys on shafts; and said carriage includes guide means with said shafts of said idler pulley means being retained by said guide means to align said roller means and allow said differential movement when said base and said carriage move relative to each other.

5. A sleeve valve actuator means as described in claim 3 wherein said cable portions substantially encircle said first end of said valve from opposite directions to provide a positive driving force to open and to close said valve when said carriage moves with respect to said mounting base.

6. A sleeve valve actuator means as described in claim 4 wherein said cable portions substantially encircle said first end of said valve from opposite directions to provide a positive driving force to open and to close said valve when said carriage moves with respect to said mounting base.

7. A sleeve valve actuator means as described in claim 6 wherein said guide means are slots in said mounting base.

* * * * *